No. 728,558. PATENTED MAY 19, 1903.
C. E. ELDRIDGE.
GAGE.
APPLICATION FILED JUNE 23, 1902.
NO MODEL.
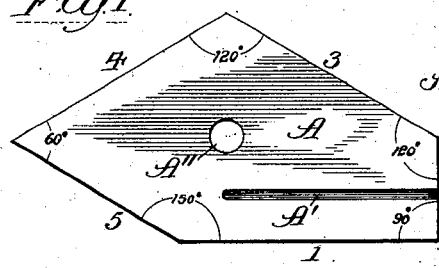
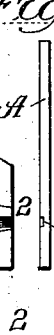
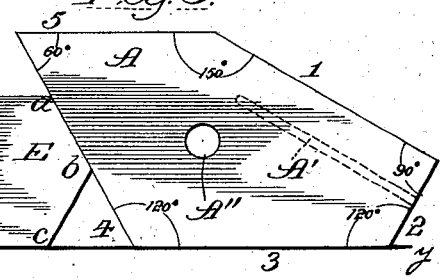
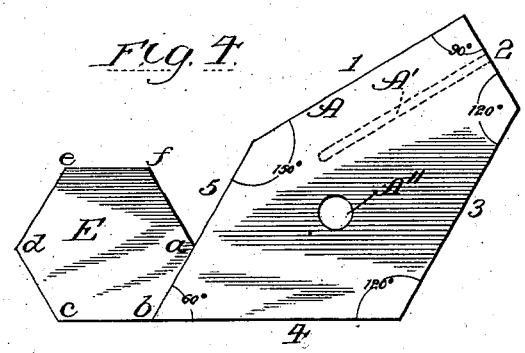
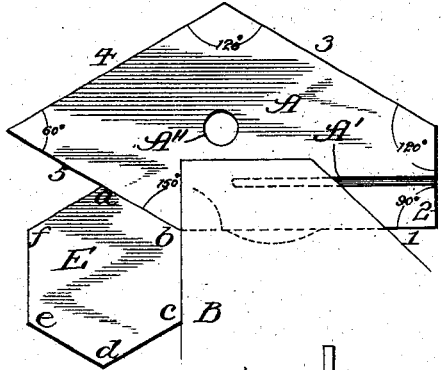
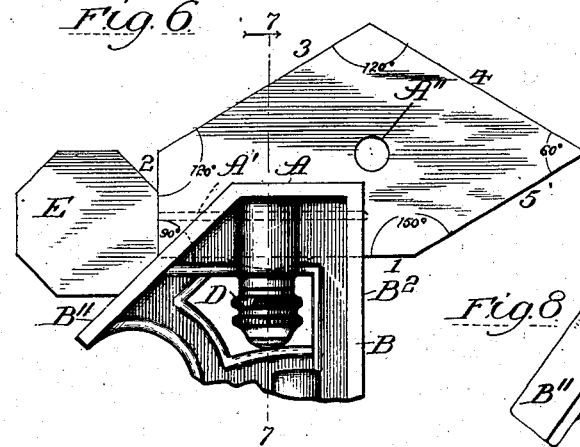
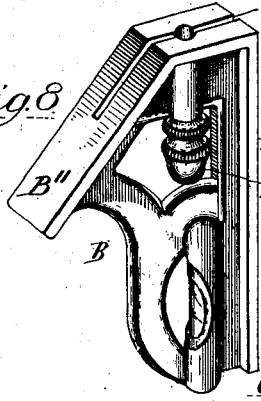
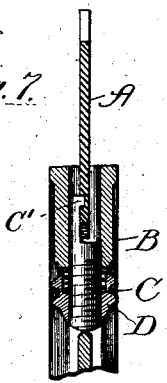
Witnesses:
Lute S. Alter.
S. Front.
Inventor:
Claude E. Eldridge
By L. W. Hopkins
Attorney.
THE NORRIS PETERS CO., PHOTO-LITHO., WASHINGTON, D. C.

No. 728,558. Patented May 19, 1903.

UNITED STATES PATENT OFFICE.

CLAUDE E. ELDRIDGE, OF JOLIET, ILLINOIS, ASSIGNOR OF ONE-HALF TO HARRY L. THOMPSON, OF CHICAGO, ILLINOIS.

GAGE.

SPECIFICATION forming part of Letters Patent No. 728,558, dated May 19, 1903.

Application filed June 23, 1902. Serial No. 112,813. (No model.)

*To all whom it may concern:*

Be it known that I, CLAUDE E. ELDRIDGE, a citizen of the United States, residing in Joliet, in the State of Illinois, have invented certain new and useful Improvements in Gages, of which the following is a specification.

The present invention relates to a gage adapted for use in plotting or laying out the work or in setting the work or in testing the work either while in progress or when finished.

It relates more particularly to a gage for plotting, setting, or testing hexagonal and octagonal figures or bodies; but it may be used for figures or bodies of other shapes for which the angles with which it is provided are appropriate. For the sake of brevity, however, this specification will be confined to its construction and use as related to hexagons and octagons, since my chief aim is to provide a gage especially adapted for use in connection with these figures, one by which they can be easily, quickly, and accurately laid out or plotted, in the first instance, or by which the work may with equal facility be set in the planer or other machine for forming them of metal or other material, or by which the work may be tested either during progress or after completion.

The gage proper consists of a sheet of some suitable material (preferably steel) of suitable thickness (preferably three thirty-seconds of an inch) having straight sides in sufficient number and at appropriate angles to make possible the plotting, setting, and testing of a hexagon, and preferably, also, the setting and testing of an octagon, a special gage for plotting or laying out an octagon being unnecessary. Preferably it is of pentagonal outline and comprises the angles ninety degrees, one hundred and twenty degrees, one hundred and twenty degrees, sixty degrees, and one hundred and fifty degrees in the relations and order named. All of the sides with the exception of the side between the angle ninety degrees and the angle one hundred and twenty degrees are appropriate to hexagonal work, while the side last named is appropriate to octagonal work. On the contrary, it would be a disadvantage, since it would increase the length of the gage and would result in a sharp point that would be objectionable, especially where the device is designed to be carried in the pocket. Preferably, also, the gage has a groove adapted to receive the projecting lip or fin of the screw of a stock or head such as the stock or head of a Starrett gage, and while this, in connection with the other features already described, is a minor feature of the invention, still I desire to have it understood that in its broadest aspect the invention is not limited thereto. On the contrary, it comprehends a gage proper having the features herein described either with or without a stock or head.

In the accompanying drawings, which are made a part of this specification, Figure 1 is a face view of the gage proper embodying the invention. Fig. 2 is an edge view thereof. Figs. 3 and 4 are face views of the gage, showing its use without a stock or head in connection with a hexagonal figure. Fig. 5 is a face view thereof and of a head or stock, showing its use in connection with a hexagonal body. Fig. 6 is a similar view showing its use in connection with an octagonal body. Fig. 7 is a section thereof on the line 7 7, Fig. 6, looking in the direction of the arrow. Fig. 8 is a perspective view of the stock.

A represents the gage proper. It has five sides 1 2 3 4 5, and consequently five angles, the sides being straight and so related as to form the angles ninety degrees, one hundred and twenty degrees, one hundred and twenty degrees, sixty degrees, and one hundred and fifty degrees, respectively.

B represents the stock or head. It has a slot B' of appropriate width to receive the gage A, the bottom of the slot being adapted to have contact with side 1 of the gage when in place and control the relation of the adjacent side 2 of the gage to a gaging-face B'' of the head or the relation of the adjacent side 5 of the gage to a gaging-surface B² of the head. The stock has also a screw C, which extends upward along one side of the slot and is provided with a lip or fin C', adapted to occupy a groove A', formed in one face of the gage parallel to the side 1. Within an opening in the stock is located a thumb-nut D, which is turned onto the screw, so that by turning the thumb-nut the screw may be moved endwise in one direction or the other, according to the direction in which the thumb-nut is turned. By turning it in one direction the lip or fin will engage the side wall of the groove and draw the side 1 of the gage into contact with the bottom of the slot B', and thereby hold the gage firmly in place in the head. By turning it in the opposite direction the gage will be released, so that it may be moved endwise, so as to permit it to be either wholly removed or to be set in position for using either of the gaging-faces B'' or B².

The bottom of the slot B', in the vicinity of the screw, has a depression, as indicated by dotted lines in Figs. 5 and 6. If the gage were moved far enough to bring the angle one hundred and fifty degrees to this depression, when the screw is drawn down the gage would cant, and thereby make it untrue. The side 5 and the gage-face B² of the head are intended for use in connection with hexagons and must therefore form an angle of one hundred and twenty degrees. If the angle one hundred and fifty degrees is drawn down into the depression aforesaid, the sides 1 will be moved out of contact and parallelism with the bottom of the slot and the side 5 will approach the gaging-face B², so that they will form an angle of less than one hundred and twenty degrees. In order to prevent this, the groove A' is terminated a sufficient distance from the angle one hundred and fifty degrees to form a stop, which comes in contact with the lip or fin C' and arrests further movement of the gage when once its side 5 reaches the proper position with relation to the gaging-face B².

For plotting or drawing, the gage, either with or without the stock, may be used as any other drawing instrument is used. Referring to Fig. 3, for example, it will be seen how it may be used for laying out a hexagonal figure E. The line $x\,y$ may represent the edge of a T-square or other straight-edge. It may be used for the top and bottom parallel sides $f\,a$ and $d\,c$ of the hexagon, or, the sides 3 and 5 of the gage being parallel, the straight-edge may be used simply for the purpose of controlling the gage, and the side 5 may be used for the top and bottom side of the hexagon. The side 4 of the gage may be used for the opposite parallel sides $a\,b$ and $e\,d$ of the hexagon, and the side 2 of the gage may be used for the remaining two sides $e\,f$ and $b\,c$ of the hexagon, or instead of using the side 2 of the gage its side 4 may be placed against the straight-edge and the side 5 used for the sides $e\,f$ and $b\,c$. Again, assuming that the line $x\,y$ represents the bed or table of a planing-machine and that the hexagon is in process of being formed, the gage may be used not only for testing the work as it progresses, but for setting it in position to be machined. Let it be supposed, for instance, that the side $a\,b$ has been finished and that it is desired to set the work for planing the side $f\,a$. The gage is placed as shown in Fig. 3, and the face of the cutter being parallel with the table it follows that the side $f\,a$ will be accurately cut. This done, to set the work for cutting the side $e\,f$, the sides $f\,a$ and $a\,b$ having been completed, the gage may be used either as shown in Fig. 3 or as shown in Fig. 4, or in both ways. If it is used in both ways, it will test the accuracy of the sides already cut, and if they are found to be inaccurate the work may be so set as to compensate for the inaccuracy, and thus save a job which might otherwise be lost.

For testing a hexagon after it is finished the gage is secured in the stock or head and the side 5 is brought to proper position with relation to the face B². The instrument is then used as shown in Fig. 5.

For testing the accuracy of an octagon after it is finished the side 2 is brought to proper position with relation to the face B'', and the instrument is used as shown in Fig. 6.

For convenience in hanging up the gage when not in use it is provided with a hole A''.

Having thus described my invention, the following is what I claim as new therein and desire to secure by Letters Patent:

1. As a new article of manufacture, a gage having the adjacent sides 3 and 4 forming the angle one hundred and twenty degrees, the side 5 adjacent to the side 4 and forming therewith the angle sixty degrees, and the side 1 adjacent to the side 5 and forming therewith the angle one hundred and fifty degrees, in combination with a stock or head having a seat for the side 1, a gaging-face forming an angle of ninety degrees with said seat and one hundred and twenty degrees with the side 5, and means for securing the side 1 on said seat, substantially as described.

2. As a new article of manufacture, a gage having the adjacent sides 3 and 4 forming the angle one hundred and twenty degrees, the side 5 adjacent to the side 4 and forming therewith the angle sixty degrees, and the side 1 adjacent to the side 5 and forming therewith the angle one hundred and fifty degrees, said gage having a slot parallel with the side 1, in combination with a stock or head having a seat for the side 1, a gaging-face forming an angle of ninety degrees with said seat and one hundred and twenty degrees with the side 5 and a screw having a lip or fin occupying the groove in the gage and adapted to hold the side 1 on its seat, substantially as described.

3. As a new article of manufacture, a gage having the sides 1 and 5 forming an angle of one hundred and fifty degrees and having a groove parallel with the side 1 and terminating some distance from the apex of said angle, in combination with a stock or head having a seat for the side 1 and a screw having a lip or fin occupying said groove, said stock or head having a gaging-face forming an angle of ninety degrees with said groove and one hundred and twenty degrees with said side 5, substantially as described.

CLAUDE E. ELDRIDGE.

Witnesses:
 H. L. THOMPSON,
 L. M. HOPKINS.